United States Patent
Barbur

Patent Number: 5,862,051
Date of Patent: Jan. 19, 1999

[54] METHOD OF CONTROLLING THE EFFECT OF RAW MATERIALS ON MANUFACTURABILITY

[75] Inventor: Vicki Ann Barbur, Berkhamsted, England

[73] Assignee: Eastman Kodak Company, Rochester, N.Y.

[21] Appl. No.: 786,006

[22] Filed: Jan. 21, 1997

[30] Foreign Application Priority Data

Feb. 3, 1996 [GB] United Kingdom .................... 9602202

[51] Int. Cl.⁶ ....................................................... G06F 11/00
[52] U.S. Cl. .................. 364/468.13; 364/468.05
[58] Field of Search ..................... 364/178, 179, 364/468.05, 468.13, 468.14, 468.09, 554; 395/674

[56] References Cited

U.S. PATENT DOCUMENTS

| | | | |
|---|---|---|---|
| 4,827,423 | 5/1989 | Beasley et al. ..................... | 364/468.05 |
| 5,444,632 | 8/1995 | Kline et al. ......................... | 364/468.05 |
| 5,594,651 | 1/1997 | St. Ville .............................. | 364/468.04 |
| 5,634,072 | 5/1997 | Allen et al. .............................. | 395/674 |
| 5,691,895 | 11/1997 | Kurtzberg et al. ....................... | 364/148 |
| 5,693,440 | 12/1997 | Barbur et al. .............................. | 430/30 |

*Primary Examiner*—Paul P. Gordon
*Attorney, Agent, or Firm*—Thomas H. Close

[57] ABSTRACT

Described herein is a method of controlling the effect of raw materials on manufacturability in which constituents in a product are controlled in a simple and effective manner prior to the constituents being committed to the manufacturing process for that product. This is achieved by deriving the $T^2$ parameter from a number of important properties of the constituents which are known to impact performance characteristics of a final product, the derived $T^2$ value being compared with a standard for that product. If the value of $T^2$ exceeds a predetermined limit, there is an indication that there has been a significant change in the typical properties of the constituents and action can be taken to replace defaulting constituents prior to manufacturing. Replaced constituents can then be used at another time so as to avoid irretrievable loss, for example, waste.

6 Claims, 11 Drawing Sheets

METHOD OF CONTROLLING THE EFFECT OF RAW MATERIALS ON MANUFACTURABILITY

FIELD OF THE INVENTION

The present invention relates to a method for controlling the effect of raw materials on manufacturability.

BACKGROUND OF THE INVENTION

When manufacturing a product from a plurality of constituents, the properties of these constituents may be critical to the manufactured product. If the properties of the constituents are not within specified boundaries, the product may not meet its specified performance characteristics. For example, in a photographic product, such as an emulsion for coating onto photographic film or paper, if the properties of the constituents (gelatin, dopants, dyes etc) are not within predetermined boundaries, the final product, the photographic emulsion, may not meet its performance characteristics such as speed or grain size.

One known method used to minimise variability in manufacturability due to the effect of raw materials over a fixed time frame involves the isolation of batches of critical constituents. This is commonly referred to as 'blocking'. In practice, large quantities of these critical constituents are set aside and used specifically for one particular product. This prevents short term variation in the product performance characteristics.

PROBLEM TO BE SOLVED BY THE INVENTION

However, shifts in the specified performance characteristics of the product may occur when one or more of these 'blocks' of constituents is exhausted and one or more new 'blocks' of constituents need to be introduced to the manufacturing process. This means that although the variability in the product performance characteristics is minimised in the short term, the new 'blocks' of constituents may cause discrete level shifts in the performance characteristics which will produce product within new limits but with an increased long term variability.

Moreover, if 'good product' is to be produced from a manufacturing process, it is essential that the constituents used to manufacture that product are selected accordingly so that only 'good product' is produced.

Previously known procedures for controlling the effect of raw materials on manufacturability were effectively based on univariate statistical process control (SPC) techniques. However, these techniques are not suitable for use with complex product manufacturing situations where a large number of variables are routinely monitored to assess the status of that product. Some of the variables in such manufacturing situations may not be independent and the degree to which the variables are correlated is often unknown, making it difficult to assess the status of the product. A situation like this cannot be adequately assessed with conventional control systems.

SUMMARY OF THE INVENTION

It is therefore an object of the present invention to eliminate the level shifts mentioned above by relying on the use of multivariate statistical techniques to achieve what can effectively be described as 'raw material verification'.

In accordance with one aspect of the present invention, there is provided a method of controlling the effect of raw material constituents on a product produced by a manufacturing process, the product being manufactured using a plurality of constituents and having specified product performance characteristics, the manufacturing process having a constituent selection stage in which the constituents are selected in accordance with the product being manufactured, the method comprising the steps of:

a) defining a set of properties for each of the constituents which affect the product performance characteristics;

b) sampling data relating to the set of properties of the constituents from product produced by the manufacturing process;

c) defining a model using the sampled data to provide a reference position for a combination of the constituents which provides good product from the manufacturing process, the model being defined using principal component analysis in terms of parameters $T^2$ and $Q_{res}$, where $T^2$ is derived from the sum of the squares of the scores of each of the principal components of the model and $Q_{res}$ is derived from a weighted sum of the squares of the scores of the principal components not included in the model;

d) applying limits to the model indicative of out-of-control conditions;

e) monitoring the constituent selection stage for out-of-control conditions; and f) taking corrective action to select appropriate constituents at the constituent selection stage which provide the specified product performance characteristics of the product.

If the $T^2$ parameter exceeds a predetermined limit, the contribution of the scores to that $T^2$ parameter value is interrogated to determine which score is the primary contributor. The score which forms the primary contributor is interrogated further to assess which of the monitored constituents is of significance.

An additional parameter $Q_{res}$ may also be assessed for the process. If either of the $T^2$ or $Q_{res}$ parameters exceeds predetermined limits, then it indicates a significant change compared with the reference system.

$T^2$ and $Q_{res}$ monitor different out-of-control behaviour, $T^2$ assessing systematic variability within the model and $Q_{res}$ the systematic non-random variability not captured by the model.

ADVANTAGEOUS EFFECT OF THE INVENTION

The method of the present invention relies on a statistical approach and provides longer term benefits than those achieved using 'blocking'. This is because the swings from one level to another as new 'blocks' of constituents are introduced are eliminated.

By using multivariate SPC techniques, the sensitivity of detecting out-of-control conditions with respect to specified product performance characteristics is increased in comparison with existing manual and labour intensive methods.

In particular, it is possible to assess the contribution of the properties of each constituent to the performance characteristics of the final product prior to committing the constituents to the manufacturing process.

In accordance with the present invention, the method of providing 'raw material verification' described herein provides a key parameter on which to base a quality assurance strategy without loss of raw material and waste product.

A potential benefit of using Hotelling's $T^2$ parameter is that it additionally yields vital information which can be used to correct any control failure problem with efficacy.

BRIEF DESCRIPTION OF THE DRAWINGS

For a better understanding of the present invention, reference will now be made, by way of example only, to the accompanying drawings in which.

DETAILED DESCRIPTION OF THE INVENTION

Figure 1:
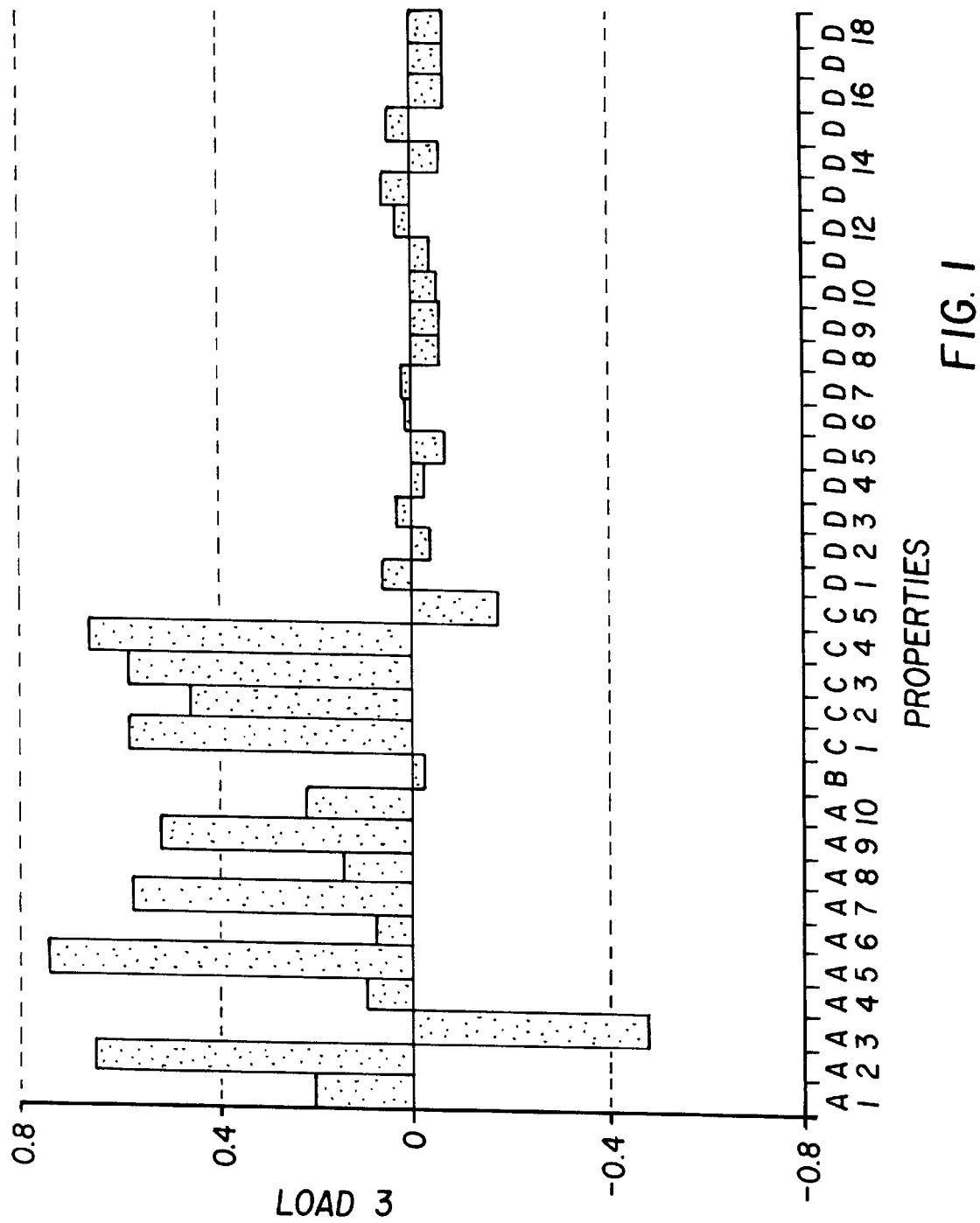
FIG. 1 is a chart showing the loadings for the third principal component.

One of the major objectives in any complex manufacturing process is to determine a strategy which minimises the effects of raw material variability so as to reduce the impact on product performance characteristics and effectively produce invariant product. In general, even when a manufacturing process is in control, product invariance will result only if the raw materials are also invariant. Increasing use of multivariate process control techniques in complex manufacturing processes have improved the ability to monitor process invariance. As a result, other areas which also have an effect on the quality of the output product need to be evaluated. The necessity to assess closely contributions to product variability from raw materials is one area.

It is well-known to control a process so that it operates within specified boundaries. This can be achieved using statistical process control (SPC) techniques which involve constant monitoring of the process. Such techniques may be univariate wherein a single variable of the process is monitored or multivariate where more than one variable is monitored. Multivariate SPC techniques are particularly well suited to use with complex processes in which a large number of variables are monitored routinely to assess the status of a particular process. Some of the variables may not be independent and the degree to which they are correlated is often unknown, and such processes cannot be assessed adequately with conventional control techniques.

A single parameter known as Hotelling's $T^2$ (Hotelling, H., (1931),*The Generalisation of Student's Ratio, Ann. Math. Statist.*, 2, pages 360–378) can be used successfully as an indicator in multivariate SPC techniques to determine the current status of the constituents that will be used in the manufacturing process. This parameter utilises all the information contained in the monitored variables, or classification categories of the constituents, as well as accounting for any correlation between them. The future state of a product is determined by the magnitude of $T^2$, for example, if it exceeds the 99% limit, then the output characteristic of a product from a process will behave in a significantly different way to that expected.

The underlying analysis required to deduce the $T^2$ parameter provides a method of quickly identifying causes of system failure. Corrective action guidelines (CAG) can be developed to facilitate the operation of the system and to provide help for common control failure conditions. These corrective actions also take place prior to the constituents being committed to the manufacturing process.

By employing Hotelling's $T^2$ and the related $Q_{res}$ parameters, a means of assessing manufacturability from raw material characteristics is provided. Data can be collected either from the producers of the materials or from in-house testing and these data are used in conjunction with multivariate techniques to achieve 'raw material verification'. It is fairly simple to transform data into a format which can be analysed readily. The results can be displayed in a graphical format to provide the required simple answer to the question concerning the suitability of a group of raw materials to produce invariant product.

The operation of the method in accordance with the present invention will be described with reference to a photographic product where differences in raw material constituents may severely alter the characteristics of that product.

For a given photographic product, there is a series of routinely measured properties for each batch of raw material, for example, levels of impurity, concentrations, levels of purity, pH etc. These data are usually displayed as a form of time series chart which relates closely to a statistical process control (SPC) chart for each raw material. This allows standard univariate SPC rules to be applied. These rules are described in detail in *Introduction to Statistical Process Control*, D. C., Montgomery, Wiley, 1991.

When there are several such charts to assess, univariate methods are inefficient and ineffective. Moreover, the ultimate characteristics of the final product are determined by the interaction of the various constituents when they are in close proximity, for example, during an emulsion making process. Any variability in the constituents or raw materials will therefore affect the variability of the final product characteristics even if the intervening stages are under control, for example, the manufacturing process. In other words, it is necessary to monitor the characteristics of the constituents or raw materials. However, it is not sufficient to assess manufacturability independently from the inherent characteristics of these constituents or raw materials in a complex process.

There will be a large impact on variability from the methods used to determine the properties of the constituents or raw materials themselves, that is, the variability of the method, its reliability and especially the degree of correlation of measured properties of the constituents with a performance characteristic of the final product.

Assessing the properties of the constituents or raw materials en masse using multivariate techniques, prior to the constituents being delivered to the manufacturing process, essentially achieve 'raw material verification' for each formulation. This result yields a 'GO/NO GO' response for a group of constituents or raw materials related to a given formulation based on the $T^2$ and $Q_{res}$ parameters. This means that it is possible to control the selection process for raw materials to ensure consistent performance characteristics of the final product providing the manufacturing process itself is verified, that is, in control.

$T^2$ and $Q_{res}$ are single numbers which capture the essential information from multiple characteristics and provide a method by which the compatibility and behaviour of groups of constituents or raw materials in the final product can be assessed prior to manufacture. The method relies on developing an algorithm for a particular formulation based on historic data which have resulted in minimum response variability in the final product, and calculating a $T^2$ value which defines a critical reference system. Any departures from this value by new combinations of constituents or raw materials can be identified before they are used irretrievably in the next stage of the manufacturing process.

By condensing information for several properties documented for each constituent or raw material in this way, it is possible to use this single value as a means of deciding whether to proceed or to reassign a group of constituents or raw materials to another product batch. Data generated in this way for various constituents or raw materials can also be used to set targets for future constituent or raw material specifications so as to eliminate wastage and large inventories.

When the calculated $T^2$ parameter exceeds the critical value for a particular formulation, it can be resolved into the various contributions from all the components so as to assess which component is responsible for excess variability in the response. Corrective actions can be developed to prevent inconsistent batches of constituents or raw materials being used in conjunction with one another in the manufacturing process to avoid waste. Naturally, any de-selected batches of raw materials or constituents can be re-selected on another occasion and used in conjunction with alternative batches of other constituents of the same formulation which have different properties. For example, if a product is manufactured using constituents X, Y and Z and a batch $Z_1$ is found not to be suitable, it can be replaced with batch $Z_2$. Unused batch $Z_1$ can then be used at a later date to manufacture the product using batches $X_2$ & $Y_1$, $X_1$ & $Y_2$ or $X_2$ & $Y_2$.

In order to illustrate the invention in more detail, a specific example is described below. The analysis of properties of a group of constituents, namely, A, B, C and D, which comprise a product formulation, is shown as a set of data illustrating measured properties of each constituent. Tables 1 to 4 illustrate the measured properties for constituent A, B, C and D respectively, and refer to batches 01 to 68 of a formulation for a particular photographic emulsion, that is, the final product in an emulsion making process. In this case, A comprises a dopant, B comprises a dye, C comprises a gas, and D comprises gelatin. The measured properties are shown for each constituent as used in each of the numbered batches.

TABLE 1

Measured properties of constituent A.

| BATCH | A1 | A2 | A3 | A4 | A5 | A6 | A7 | A8 | A9 | A10 |
|---|---|---|---|---|---|---|---|---|---|---|
| 01 | 0.1 | 31 | 99.8 | 0.77 | 0.29 | 2.8 | 0.35 | 0.4 | 3 | 3.1 |
| 02 | 0.1 | 31 | 99.8 | 0.77 | 0.29 | 2.8 | 0.35 | 0.4 | 3 | 3.1 |
| 03 | 0.1 | 31 | 99.8 | 0.77 | 0.29 | 2.8 | 0.35 | 0.4 | 3 | 3.1 |
| 04 | 0.13 | 19 | 98.6 | 0.62 | 0.5 | 2 | 0.13 | 0.93 | 3.5 | 2 |
| 05 | 0.13 | 19 | 98.6 | 0.62 | 0.5 | 2 | 0.13 | 0.93 | 3.5 | 2 |
| 06 | 0.13 | 19 | 98.6 | 0.62 | 0.5 | 2 | 0.13 | 0.93 | 3.5 | 2 |
| 07 | 0.13 | 19 | 98.6 | 0.62 | 0.5 | 2 | 0.13 | 0.93 | 3.5 | 2 |
| 08 | 0.13 | 19 | 98.6 | 0.62 | 0.5 | 2 | 0.13 | 0.93 | 3.5 | 2 |
| 09 | 0.13 | 19 | 98.6 | 0.62 | 0.5 | 2 | 0.13 | 0.93 | 3.5 | 2 |
| 10 | 0.13 | 19 | 98.6 | 0.62 | 0.5 | 2 | 0.13 | 0.93 | 3.5 | 2 |
| 11 | 0.13 | 19 | 98.6 | 0.62 | 0.5 | 2 | 0.13 | 0.93 | 3.5 | 2 |
| 12 | 0.13 | 19 | 98.6 | 0.62 | 0.5 | 2 | 0.13 | 0.93 | 3.5 | 2 |
| 13 | 0.16 | 20 | 98.5 | 1.9 | 0.54 | 5.9 | 0.9 | 1.2 | 4.7 | 1.4 |
| 14 | 0.16 | 20 | 98.5 | 1.9 | 0.54 | 5.9 | 0.9 | 1.2 | 4.7 | 1.4 |
| 15 | 0.16 | 20 | 98.5 | 1.9 | 0.54 | 5.9 | 0.9 | 1.2 | 4.7 | 1.4 |
| 16 | 0.16 | 20 | 98.5 | 1.9 | 0.54 | 5.9 | 0.9 | 1.2 | 4.7 | 1.4 |
| 17 | 0.16 | 20 | 98.5 | 1.9 | 0.54 | 5.9 | 0.9 | 1.2 | 4.7 | 1.4 |
| 18 | 0.16 | 20 | 99.5 | 1.9 | 0.54 | 5.9 | 0.9 | 1.2 | 4.7 | 1.4 |
| 19 | 0.16 | 20 | 98.5 | 1.9 | 0.54 | 5.9 | 0.9 | 1.2 | 4.7 | 1.4 |
| 20 | 0.16 | 20 | 98.5 | 1.9 | 0.54 | 5.9 | 0.9 | 1.2 | 4.7 | 1.4 |
| 21 | 0.16 | 20 | 98.5 | 1.9 | 0.54 | 5.9 | 0.9 | 1.2 | 4.7 | 1.4 |
| 22 | 0.16 | 20 | 98.5 | 1.9 | 0.54 | 5.9 | 0.9 | 1.2 | 4.7 | 1.4 |
| 23 | 0.16 | 20 | 99.5 | 1.9 | 0.54 | 5.9 | 0.9 | 1.2 | 4.7 | 1.4 |
| 24 | 0.16 | 20 | 99.5 | 1.9 | 0.54 | 5.9 | 0.9 | 1.2 | 4.7 | 1.4 |
| 25 | 0.35 | 25 | 98.3 | 0.71 | 0.76 | 1.5 | 0.31 | 0.74 | 3.4 | 1.1 |
| 26 | 0.35 | 25 | 98.3 | 0.71 | 0.76 | 1.5 | 0.31 | 0.74 | 3.4 | 1.1 |
| 27 | 0.35 | 25 | 98.3 | 0.71 | 0.76 | 1.5 | 0.31 | 0.74 | 3.4 | 1.1 |
| 28 | 0.35 | 25 | 98.3 | 0.71 | 0.76 | 1.5 | 0.31 | 0.74 | 3.4 | 1.1 |
| 29 | 0.35 | 25 | 96.3 | 0.71 | 0.76 | 1.5 | 0.31 | 0.74 | 3.4 | 1.1 |
| 30 | 0.35 | 25 | 98.3 | 0.71 | 0.76 | 1.5 | 0.31 | 0.74 | 3.4 | 1.1 |
| 31 | 0.35 | 25 | 98.3 | 0.71 | 0.76 | 1.5 | 0.31 | 0.74 | 3.4 | 1.1 |
| 32 | 0.29 | 15 | 99.2 | 0.63 | 0.29 | 1.2 | 0.08 | 0.86 | 1.3 | 0.4 |
| 33 | 0.29 | 15 | 99.2 | 0.63 | 0.29 | 1.3 | 0.08 | 0.56 | 1.3 | 0.4 |
| 34 | 0.29 | 15 | 99.2 | 0.63 | 0.29 | 1.2 | 0.08 | 0.56 | 1.3 | 0.4 |
| 35 | 0.35 | 25 | 98.3 | 0.71 | 0.76 | 1.5 | 0.31 | 0.74 | 3.4 | 1.1 |
| 36 | 0.25 | 25 | 98.3 | 0.71 | 0.76 | 1.5 | 0.31 | 0.74 | 3.4 | 1.1 |
| 37 | 0.35 | 25 | 98.3 | 0.71 | 0.76 | 1.5 | 0.31 | 0.74 | 3.4 | 1.1 |
| 38 | 0.1 | 31 | 99.8 | 0.77 | 0.29 | 2.8 | 0.35 | 0.4 | 3 | 3.1 |
| 39 | 0.13 | 19 | 98.6 | 0.62 | 0.5 | 2 | 0.13 | 0.93 | 3.5 | 2 |
| 40 | 0.13 | 19 | 98.6 | 0.62 | 0.5 | 2 | 0.13 | 0.93 | 3.5 | 2 |
| 41 | 0.16 | 20 | 98.5 | 1.9 | 0.54 | 5.9 | 0.09 | 1.2 | 4.7 | 1.4 |
| 42 | 0.16 | 20 | 98.5 | 1.9 | 0.54 | 5.9 | 0.09 | 1.2 | 4.7 | 1.4 |

TABLE 1-continued

Measured properties of constituent A.

| BATCH | A1 | A2 | A3 | A4 | A5 | A6 | A7 | A8 | A9 | A10 |
|---|---|---|---|---|---|---|---|---|---|---|
| 43 | 0.16 | 20 | 98.5 | 1.9 | 0.54 | 5.9 | 0.09 | 1.2 | 4.7 | 1.4 |
| 44 | 0.16 | 20 | 98.5 | 1.9 | 0.54 | 5.9 | 0.09 | 1.2 | 4.7 | 1.4 |
| 45 | 0.16 | 20 | 98.5 | 1.9 | 0.54 | 5.9 | 0.09 | 1.2 | 4.7 | 1.4 |
| 46 | 0.35 | 25 | 98.3 | 0.71 | 0.76 | 1.5 | 0.31 | 0.74 | 3.4 | 1.1 |
| 47 | 0.29 | 15 | 99.2 | 0.63 | 0.29 | 1.3 | 0.08 | 0.56 | 1.3 | 0.4 |
| 48 | 0.35 | 25 | 98.3 | 0.71 | 0.76 | 1.5 | 0.31 | 0.74 | 3.4 | 1.1 |
| 49 | 0.29 | 15 | 99.2 | 0.63 | 0.29 | 1.3 | 0.08 | 0.56 | 1.3 | 0.4 |
| 50 | 0.13 | 19 | 98.6 | 0.62 | 0.5 | 2 | 0.13 | 0.93 | 3.5 | 2 |
| 51 | 0.13 | 19 | 98.6 | 0.62 | 0.5 | 2 | 0.13 | 0.93 | 3.5 | 2 |
| 52 | 0.13 | 19 | 98.6 | 0.62 | 0.5 | 2 | 0.13 | 0.93 | 3.5 | 2 |
| 53 | 0.13 | 19 | 98.6 | 0.62 | 0.5 | 2 | 0.13 | 0.93 | 3.5 | 2 |
| 54 | 0.13 | 19 | 98.6 | 0.62 | 0.5 | 2 | 0.13 | 0.93 | 3.5 | 2 |
| 55 | 0.16 | 20 | 98.5 | 1.9 | 0.54 | 5.9 | 0.09 | 1.2 | 4.7 | 1.4 |
| 56 | 0.16 | 20 | 98.5 | 1.9 | 0.54 | 5.9 | 0.09 | 1.2 | 4.7 | 1.4 |
| 57 | 0.16 | 20 | 98.5 | 1.9 | 0.54 | 5.9 | 0.09 | 1.2 | 4.7 | 1.4 |
| 58 | 0.16 | 20 | 98.5 | 1.9 | 0.54 | 5.9 | 0.09 | 1.2 | 4.7 | 1.4 |
| 59 | 0.35 | 25 | 98.3 | 0.71 | 0.76 | 1.5 | 0.31 | 0.74 | 3.4 | 1.1 |
| 60 | 0.35 | 25 | 98.3 | 0.71 | 0.76 | 1.5 | 0.31 | 0.74 | 3.4 | 1.1 |
| 61 | 0.35 | 25 | 98.3 | 0.71 | 0.76 | 1.5 | 0.31 | 0.74 | 3.4 | 1.1 |
| 62 | 0.35 | 25 | 99.3 | 0.71 | 0.76 | 1.5 | 0.31 | 0.74 | 3.4 | 1.1 |
| 63 | 0.35 | 25 | 98.3 | 0.71 | 0.76 | 1.5 | 0.31 | 0.74 | 3.4 | 1.1 |
| 64 | 0.35 | 25 | 98.3 | 0.71 | 0.76 | 1.5 | 0.31 | 0.74 | 3.4 | 1.1 |
| 65 | 0.29 | 15 | 99.2 | 0.63 | 0.29 | 1.3 | 0.08 | 0.56 | 1.3 | 0.4 |
| 66 | 0.29 | 15 | 99.2 | 0.63 | 0.29 | 1.3 | 0.08 | 0.56 | 1.3 | 0.4 |
| 67 | 0.13 | 19 | 98.6 | 0.62 | 0.5 | 2 | 0.13 | 0.93 | 3.5 | 2 |
| 68 | 0.16 | 20 | 99.5 | 1.9 | 0.54 | 5.9 | 0.09 | 1.2 | 4.7 | 1.4 |

TABLE 2

Measured property of constituent B.

| BATCH | PROPERTY |
|---|---|
| 01 | 0.1 |
| 02 | 0.1 |
| 03 | 0.1 |
| 04 | 0.1 |
| 05 | 0.1 |
| 06 | 0.1 |
| 07 | 0.1 |
| 08 | 1.12 |
| 09 | 1.12 |
| 10 | 1.17 |
| 11 | 1.17 |
| 12 | 1.17 |
| 13 | 1.17 |
| 14 | 1.17 |
| 15 | 1.17 |
| 16 | 0.6 |
| 17 | 0.6 |
| 18 | 0.6 |
| 19 | 0.6 |
| 20 | 0.6 |
| 21 | 0.6 |
| 22 | 0.6 |
| 23 | 0.6 |
| 24 | 0.6 |
| 25 | 0.61 |
| 26 | 0.61 |
| 27 | 0.61 |
| 28 | 0.61 |
| 29 | 0.61 |
| 30 | 0.61 |
| 31 | 0.61 |
| 32 | 0.42 |
| 33 | 0.42 |
| 34 | 0.42 |
| 35 | 0.42 |
| 36 | 0.42 |
| 37 | 0.42 |
| 38 | 0.1 |
| 39 | 0.1 |
| 40 | 1.12 |
| 41 | 1.17 |
| 42 | 1.17 |
| 43 | 0.6 |
| 44 | 0.6 |
| 45 | 0.6 |
| 46 | 0.61 |
| 47 | 0.42 |
| 48 | 0.42 |
| 49 | 0.79 |
| 50 | 1.12 |
| 51 | 1.12 |
| 52 | 1.8 |
| 53 | 0.5 |
| 54 | 1.17 |
| 55 | 1.17 |
| 56 | 1.17 |
| 57 | 0.6 |
| 58 | 0.6 |
| 59 | 0.61 |
| 60 | 0.61 |
| 61 | 0.61 |
| 62 | 0.61 |
| 63 | 0.61 |
| 64 | 0.61 |
| 65 | 0.42 |
| 66 | 0.79 |
| 67 | 1.17 |
| 68 | 0.6 |

TABLE 3

Measured properties of constituent C.

| BATCH | C1 | C2 | C3 | C4 | C5 |
|---|---|---|---|---|---|
| 01 | 1.82 | 4.2 | 4.92 | 522 | 0.37 |
| 02 | 1.82 | 4.2 | 4.92 | 522 | 0.37 |
| 03 | 1.82 | 4.2 | 4.92 | 522 | 0.37 |
| 04 | 1.82 | 4.2 | 4.92 | 522 | 0.37 |
| 05 | 1.82 | 4.2 | 4.92 | 522 | 0.37 |
| 06 | 1.82 | 4.2 | 4.92 | 522 | 0.37 |
| 07 | 1.82 | 4.2 | 4.92 | 522 | 0.37 |
| 08 | 1.82 | 4.2 | 4.92 | 522 | 0.37 |
| 09 | 1.82 | 4.2 | 4.92 | 522 | 0.37 |
| 10 | 1.82 | 4.2 | 4.92 | 522 | 0.37 |
| 11 | 1.82 | 4.2 | 4.92 | 522 | 0.37 |
| 12 | 1.82 | 4.2 | 4.92 | 522 | 0.37 |
| 13 | 1.79 | 4.34 | 4.93 | 618 | 0.363 |
| 14 | 1.79 | 4.34 | 4.93 | 618 | 0.363 |
| 15 | 1.79 | 4.34 | 4.93 | 618 | 0.363 |
| 16 | 1.79 | 4.34 | 4.93 | 618 | 0.363 |
| 17 | 1.79 | 4.34 | 4.93 | 618 | 0.363 |
| 18 | 1.79 | 4.34 | 4.93 | 618 | 0.363 |
| 19 | 1.79 | 4.34 | 4.93 | 618 | 0.363 |
| 20 | 1.79 | 4.34 | 4.93 | 618 | 0.363 |
| 21 | 1.79 | 4.34 | 4.93 | 618 | 0.363 |
| 22 | 1.79 | 4.34 | 4.93 | 618 | 0.363 |
| 23 | 1.79 | 4.34 | 4.93 | 618 | 0.363 |
| 24 | 1.79 | 4.34 | 4.93 | 618 | 0.363 |
| 25 | 1.86 | 4.38 | 4.91 | 614 | 0.379 |
| 26 | 1.86 | 4.38 | 4.91 | 614 | 0.379 |
| 27 | 1.86 | 4.38 | 4.91 | 614 | 0.379 |
| 28 | 1.86 | 4.38 | 4.91 | 614 | 0.379 |
| 29 | 1.86 | 4.38 | 4.91 | 614 | 0.379 |
| 30 | 1.86 | 4.38 | 4.91 | 614 | 0.379 |
| 31 | 1.86 | 4.38 | 4.91 | 614 | 0.379 |
| 32 | 1.8 | 4.28 | 4.68 | 5.89 | 0.385 |
| 33 | 1.8 | 4.28 | 4.68 | 5.89 | 0.385 |
| 34 | 1.8 | 4.28 | 4.68 | 5.89 | 0.385 |
| 35 | 1.8 | 4.28 | 4.68 | 5.89 | 0.385 |
| 36 | 1.8 | 4.28 | 4.68 | 5.89 | 0.385 |
| 37 | 1.8 | 4.28 | 4.68 | 5.89 | 0.385 |
| 38 | 1.82 | 4.2 | 4.92 | 522 | 0.37 |
| 39 | 1.82 | 4.2 | 4.92 | 522 | 0.37 |
| 40 | 1.82 | 4.2 | 4.92 | 522 | 0.37 |
| 41 | 1.79 | 4.34 | 4.93 | 618 | 0.363 |
| 42 | 1.79 | 4.34 | 4.93 | 618 | 0.363 |
| 43 | 1.79 | 4.34 | 4.93 | 618 | 0.363 |
| 44 | 1.79 | 4.34 | 4.93 | 618 | 0.363 |
| 45 | 1.79 | 4.34 | 4.93 | 618 | 0.363 |
| 46 | 1.86 | 4.38 | 4.91 | 614 | 0.379 |
| 47 | 1.8 | 4.28 | 4.68 | 5.89 | 0.385 |
| 48 | 1.8 | 4.28 | 4.68 | 5.89 | 0.385 |
| 49 | 1.8 | 4.28 | 4.68 | 5.89 | 0.385 |
| 50 | 1.82 | 4.2 | 4.92 | 522 | 0.37 |
| 51 | 1.82 | 4.2 | 4.92 | 522 | 0.37 |
| 52 | 2.2 | 4.1 | 4.92 | 522 | 0.37 |
| 53 | 1.5 | 4.5 | 4.92 | 522 | 0.37 |
| 54 | 1.79 | 4.34 | 4.93 | 618 | 0.363 |
| 55 | 1.82 | 4.2 | 4.92 | 522 | 0.37 |
| 56 | 1.82 | 4.2 | 4.92 | 522 | 0.37 |
| 57 | 1.79 | 4.34 | 4.93 | 618 | 0.363 |
| 58 | 1.79 | 4.34 | 4.93 | 618 | 0.363 |
| 59 | 1.86 | 4.38 | 4.91 | 614 | 0.379 |
| 60 | 1.86 | 4.38 | 4.91 | 614 | 0.379 |
| 61 | 1.86 | 4.38 | 4.91 | 614 | 0.379 |
| 62 | 1.86 | 4.38 | 4.91 | 614 | 0.379 |
| 63 | 1.86 | 4.38 | 4.91 | 614 | 0.379 |
| 64 | 1.86 | 4.38 | 4.91 | 614 | 0.379 |
| 65 | 1.8 | 4.28 | 4.68 | 5.89 | 0.385 |
| 66 | 1.8 | 4.28 | 4.68 | 5.89 | 0.385 |
| 67 | 1.82 | 4.2 | 4.92 | 522 | 0.37 |
| 68 | 1.79 | 4.34 | 4.93 | 618 | 0.363 |

TABLE 4

Measured properties of constituent D.

| BATCH | D1 | D2 | D3 | D4 | D5 | D6 | D7 | D8 | D9 |
|---|---|---|---|---|---|---|---|---|---|
| 01 | 283 | 8.63 | 5.76 | 12.41 | 0.08 | 0.021 | 5050 | 248 | 175 |
| 02 | 283 | 8.63 | 5.76 | 12.41 | 0.08 | 0.021 | 5050 | 248 | 175 |
| 03 | 283 | 8.63 | 5.76 | 12.41 | 0.08 | 0.021 | 5050 | 248 | 175 |
| 04 | 283 | 8.63 | 5.76 | 12.41 | 0.08 | 0.021 | 5050 | 248 | 175 |
| 05 | 283 | 8.63 | 5.76 | 12.41 | 0.08 | 0.021 | 5050 | 248 | 175 |
| 06 | 283 | 8.63 | 5.76 | 12.41 | 0.08 | 0.021 | 5050 | 248 | 175 |
| 07 | 283 | 8.63 | 5.76 | 12.41 | 0.08 | 0.021 | 5050 | 248 | 175 |
| 08 | 273 | 8.62 | 5.75 | 12.28 | 0.094 | 0.016 | 5097 | 302 | 185 |
| 09 | 273 | 8.62 | 5.75 | 12.28 | 0.094 | 0.016 | 5097 | 302 | 185 |
| 10 | 273 | 8.62 | 5.75 | 12.28 | 0.094 | 0.016 | 5097 | 302 | 185 |
| 11 | 273 | 8.62 | 5.75 | 12.28 | 0.094 | 0.016 | 5097 | 302 | 185 |
| 12 | 273 | 8.62 | 5.75 | 12.28 | 0.094 | 0.016 | 5097 | 302 | 185 |
| 13 | 273 | 8.62 | 5.75 | 12.28 | 0.094 | 0.016 | 5097 | 302 | 185 |
| 14 | 273 | 8.62 | 5.75 | 12.28 | 0.094 | 0.016 | 5097 | 302 | 185 |
| 15 | 273 | 8.62 | 5.75 | 12.28 | 0.094 | 0.016 | 5097 | 302 | 185 |
| 16 | 273 | 8.62 | 5.75 | 12.28 | 0.094 | 0.016 | 5097 | 302 | 185 |
| 17 | 273 | 8.62 | 5.75 | 12.28 | 0.094 | 0.016 | 5097 | 302 | 185 |
| 18 | 273 | 8.62 | 5.75 | 12.28 | 0.094 | 0.016 | 5097 | 302 | 185 |
| 19 | 273 | 8.62 | 5.75 | 12.28 | 0.094 | 0.016 | 5097 | 302 | 185 |
| 20 | 273 | 8.62 | 5.75 | 12.28 | 0.094 | 0.016 | 5097 | 302 | 185 |
| 21 | 273 | 8.62 | 5.75 | 12.28 | 0.094 | 0.016 | 5097 | 302 | 185 |
| 22 | 273 | 8.62 | 5.75 | 12.28 | 0.094 | 0.016 | 5097 | 302 | 185 |
| 23 | 273 | 8.62 | 5.75 | 12.28 | 0.094 | 0.016 | 5097 | 302 | 185 |
| 24 | 273 | 8.62 | 5.75 | 12.28 | 0.094 | 0.016 | 5097 | 302 | 185 |
| 25 | 278 | 8.27 | 5.75 | 11.96 | 0.086 | 0.014 | 5183 | 278 | 165 |
| 26 | 278 | 8.27 | 5.75 | 11.96 | 0.086 | 0.014 | 5183 | 278 | 165 |
| 27 | 278 | 8.27 | 5.75 | 11.96 | 0.086 | 0.014 | 5183 | 278 | 165 |
| 28 | 278 | 8.27 | 5.75 | 11.96 | 0.086 | 0.014 | 5183 | 278 | 165 |

TABLE 4-continued

Measured properties of constituent D.

| | | | | | | | | |
|---|---|---|---|---|---|---|---|---|
| 29 | 278 | 8.27 | 5.75 | 11.96 | 0.086 | 0.014 | 5183 | 278 | 165 |
| 30 | 278 | 8.27 | 5.75 | 11.96 | 0.086 | 0.014 | 5183 | 278 | 165 |
| 31 | 278 | 8.27 | 5.75 | 11.96 | 0.086 | 0.014 | 5183 | 278 | 165 |
| 32 | 278 | 8.27 | 5.75 | 11.96 | 0.086 | 0.014 | 5183 | 278 | 165 |
| 33 | 278 | 8.27 | 5.75 | 11.96 | 0.086 | 0.014 | 5183 | 278 | 165 |
| 34 | 278 | 8.27 | 5.75 | 11.96 | 0.086 | 0.014 | 5183 | 278 | 165 |
| 35 | 278 | 8.27 | 5.75 | 11.96 | 0.086 | 0.014 | 5183 | 278 | 165 |
| 36 | 278 | 8.27 | 5.75 | 11.96 | 0.086 | 0.014 | 5183 | 278 | 165 |
| 37 | 278 | 8.27 | 5.75 | 11.96 | 0.086 | 0.014 | 5183 | 278 | 165 |
| 38 | 283 | 8.63 | 5.76 | 12.41 | 0.08 | 0.021 | 5050 | 248 | 175 |
| 39 | 283 | 8.63 | 5.76 | 12.41 | 0.08 | 0.021 | 5050 | 248 | 175 |
| 40 | 273 | 8.82 | 5.75 | 12.28 | 0.094 | 0.016 | 5097 | 302 | 185 |
| 41 | 273 | 8.62 | 5.75 | 12.28 | 0.094 | 0.016 | 5097 | 302 | 185 |
| 42 | 273 | 8.62 | 5.75 | 12.28 | 0.094 | 0.016 | 5097 | 302 | 185 |
| 43 | 273 | 8.62 | 5.75 | 12.28 | 0.094 | 0.016 | 5097 | 302 | 185 |
| 44 | 273 | 8.62 | 5.75 | 12.28 | 0.094 | 0.016 | 5097 | 302 | 185 |
| 45 | 273 | 8.62 | 5.75 | 12.28 | 0.094 | 0.016 | 5097 | 302 | 185 |
| 46 | 278 | 8.27 | 5.75 | 11.96 | 0.086 | 0.014 | 5183 | 278 | 165 |
| 47 | 278 | 8.27 | 5.75 | 11.96 | 0.086 | 0.014 | 5183 | 278 | 165 |
| 48 | 278 | 8.27 | 5.75 | 11.96 | 0.086 | 0.014 | 5183 | 278 | 165 |
| 49 | 278 | 8.27 | 5.75 | 11.96 | 0.086 | 0.014 | 5183 | 278 | 165 |
| 50 | 283 | 8.63 | 5.76 | 12.41 | 0.08 | 0.021 | 5050 | 248 | 175 |
| 51 | 283 | 8.63 | 5.76 | 12.41 | 0.08 | 0.021 | 5050 | 248 | 175 |
| 52 | 283 | 8.63 | 5.76 | 12.41 | 0.08 | 0.021 | 5050 | 248 | 175 |
| 53 | 283 | 8.63 | 5.76 | 12.41 | 0.08 | 0.021 | 5050 | 248 | 175 |
| 54 | 273 | 8.62 | 5.75 | 12.28 | 0.094 | 0.016 | 5097 | 302 | 185 |
| 55 | 273 | 8.62 | 5.75 | 12.28 | 0.094 | 0.016 | 5097 | 302 | 185 |
| 56 | 273 | 8.62 | 5.75 | 12.28 | 0.094 | 0.016 | 5097 | 302 | 185 |
| 57 | 273 | 8.62 | 5.75 | 12.28 | 0.094 | 0.016 | 5097 | 302 | 185 |
| 58 | 273 | 8.62 | 5.75 | 12.28 | 0.094 | 0.016 | 5097 | 302 | 185 |
| 59 | 278 | 8.27 | 5.75 | 11.96 | 0.086 | 0.014 | 5183 | 278 | 165 |
| 60 | 278 | 8.27 | 5.75 | 11.96 | 0.086 | 0.014 | 5183 | 278 | 165 |
| 61 | 278 | 8.27 | 5.75 | 11.96 | 0.086 | 0.014 | 5183 | 278 | 165 |
| 62 | 278 | 8.27 | 5.76 | 11.96 | 0.086 | 0.014 | 5183 | 278 | 165 |
| 63 | 278 | 8.27 | 5.75 | 11.96 | 0.086 | 0.014 | 5183 | 278 | 185 |
| 64 | 278 | 8.27 | 5.75 | 11.96 | 0.086 | 0.014 | 5183 | 278 | 165 |
| 65 | 278 | 8.27 | 5.75 | 11.96 | 0.086 | 0.014 | 5183 | 278 | 165 |
| 66 | 278 | 8.27 | 5.75 | 11.96 | 0.086 | 0.014 | 5183 | 278 | 165 |
| 67 | 273 | 8.62 | 5.75 | 12.28 | 0.094 | 0.016 | 5097 | 302 | 185 |
| 68 | 273 | 8.62 | 5.75 | 12.28 | 0.094 | 0.016 | 5097 | 302 | 185 |

| BATCH | D10 | D11 | D12 | D13 | D14 | D15 | D16 | D17 | D18 |
|---|---|---|---|---|---|---|---|---|---|
| 01 | 4715 | 5 | 0.8 | 0.8 | 197 | 4 | 330 | 0.1 | 0.8 |
| 02 | 4715 | 5 | 0.8 | 0.8 | 197 | 4 | 330 | 0.1 | 0.8 |
| 03 | 4715 | 5 | 0.8 | 0.8 | 197 | 4 | 330 | 0.1 | 0.8 |
| 04 | 4715 | 5 | 0.8 | 0.8 | 197 | 4 | 330 | 0.1 | 0.8 |
| 05 | 4715 | 5 | 0.8 | 0.8 | 197 | 4 | 330 | 0.1 | 0.8 |
| 06 | 4715 | 5 | 0.8 | 0.8 | 197 | 4 | 330 | 0.1 | 0.8 |
| 07 | 4715 | 5 | 0.6 | 0.8 | 197 | 4 | 330 | 0.1 | 0.8 |
| 08 | 5153 | 5 | 0.6 | 0.4 | 213 | 3.5 | 445 | 1.4 | 1.4 |
| 09 | 5153 | 5 | 0.6 | 0.4 | 213 | 3.5 | 445 | 1.4 | 1.4 |
| 10 | 5153 | 5 | 0.6 | 0.4 | 213 | 3.5 | 445 | 1.4 | 1.4 |
| 11 | 5153 | 5 | 0.6 | 0.4 | 213 | 3.5 | 445 | 1.4 | 1.4 |
| 12 | 5153 | 5 | 0.6 | 0.4 | 213 | 3.5 | 445 | 1.4 | 1.4 |
| 13 | 5153 | 5 | 0.6 | 0.4 | 213 | 3.5 | 445 | 1.4 | 1.4 |
| 14 | 5153 | 5 | 0.6 | 0.4 | 213 | 3.5 | 445 | 1.4 | 1.4 |
| 15 | 5153 | 5 | 0.6 | 0.4 | 213 | 3.5 | 445 | 1.4 | 1.4 |
| 16 | 5153 | 5 | 0.6 | 0.4 | 213 | 3.5 | 445 | 1.4 | 1.4 |
| 17 | 5153 | 5 | 0.6 | 0.4 | 213 | 3.5 | 445 | 1.4 | 1.4 |
| 16 | 5153 | 5 | 0.6 | 0.4 | 213 | 3.5 | 445 | 1.4 | 1.4 |
| 19 | 5153 | 5 | 0.6 | 0.4 | 213 | 3.5 | 445 | 1.4 | 1.4 |
| 20 | 5153 | 5 | 0.6 | 0.4 | 213 | 3.5 | 445 | 1.4 | 1.4 |
| 21 | 5153 | 5 | 0.6 | 0.4 | 213 | 3.5 | 445 | 1.4 | 1.4 |
| 22 | 5153 | 5 | 0.6 | 0.4 | 213 | 3.5 | 445 | 1.4 | 1.4 |
| 23 | 5153 | 5 | 0.6 | 0.4 | 213 | 3.5 | 445 | 1.4 | 1.4 |
| 24 | 5153 | 5 | 0.6 | 0.4 | 213 | 3.5 | 445 | 1.4 | 1.4 |
| 25 | 5059 | 3 | 0.6 | 0.6 | 207 | 7 | 306 | 0.09 | 1 |
| 26 | 5059 | 3 | 0.6 | 0.6 | 207 | 7 | 306 | 0.09 | 1 |
| 27 | 5059 | 3 | 0.6 | 0.6 | 207 | 7 | 306 | 0.09 | 1 |
| 28 | 5059 | 3 | 0.6 | 0.6 | 207 | 7 | 306 | 0.09 | 1 |
| 29 | 5059 | 3 | 0.6 | 0.6 | 207 | 7 | 306 | 0.09 | 1 |
| 30 | 5059 | 3 | 0.6 | 0.6 | 207 | 7 | 306 | 0.09 | |
| 31 | 5059 | 3 | 0.6 | 0.6 | 207 | 7 | 306 | 0.09 | 1 |
| 32 | 5059 | 3 | 0.6 | 0.6 | 207 | 7 | 306 | 0.09 | 1 |
| 33 | 5059 | 3 | 0.6 | 0.6 | 207 | 7 | 306 | 0.09 | 1 |
| 34 | 5059 | 3 | 0.6 | 0.6 | 207 | 7 | 306 | 0.09 | 1 |

TABLE 4-continued

Measured properties of constituent D.

| 35 | 5059 | 3 | 0.6 | 0.6 | 207 | 7 | 306 | 0.09 | 1 |
| 36 | 5059 | 3 | 0.6 | 0.6 | 207 | 7 | 306 | 0.09 | 1 |
| 37 | 5059 | 3 | 0.6 | 0.6 | 207 | 7 | 306 | 0.09 | 1 |
| 38 | 4715 | 5 | 0.8 | 0.8 | 197 | 4 | 330 | 0.1 | 0.8 |
| 39 | 4715 | 5 | 0.8 | 0.8 | 197 | 4 | 330 | 0.1 | 0.8 |
| 40 | 5153 | 5 | 0.6 | 0.4 | 213 | 3.5 | 445 | 1.4 | 1.4 |
| 41 | 5153 | 5 | 0.6 | 0.4 | 213 | 3.5 | 445 | 1.4 | 1.4 |
| 42 | 5153 | 5 | 0.6 | 0.4 | 213 | 3.5 | 445 | 1.4 | 1.4 |
| 43 | 5153 | 5 | 0.6 | 0.4 | 213 | 3.5 | 445 | 1.4 | 1.4 |
| 44 | 5153 | 5 | 0.6 | 0.4 | 213 | 3.5 | 445 | 1.4 | 1.4 |
| 45 | 5153 | 5 | 0.6 | 0.4 | 213 | 3.5 | 445 | 1.4 | 1.4 |
| 46 | 5059 | 3 | 0.6 | 0.6 | 207 | 7 | 306 | 0.09 | 1 |
| 47 | 5059 | 3 | 0.6 | 0.6 | 207 | 7 | 306 | 0.09 | 1 |
| 48 | 5059 | 3 | 0.6 | 0.6 | 207 | 7 | 306 | 0.09 | 1 |
| 49 | 5059 | 3 | 0.6 | 0.6 | 207 | 7 | 306 | 0.09 | 1 |
| 50 | 4715 | 5 | 0.8 | 0.8 | 197 | 4 | 330 | 0.1 | 0.8 |
| 51 | 4715 | 5 | 0.8 | 0.8 | 197 | 4 | 330 | 0.1 | 0.8 |
| 52 | 4715 | 5 | 0.8 | 0.8 | 197 | 4 | 330 | 0.1 | 0.8 |
| 53 | 4715 | 5 | 0.8 | 0.8 | 197 | 4 | 330 | 0.1 | 0.8 |
| 54 | 5153 | 5 | 0.6 | 0.4 | 213 | 3.5 | 445 | 1.4 | 1.4 |
| 55 | 5153 | 5 | 0.6 | 0.4 | 213 | 3.5 | 445 | 1.4 | 1.4 |
| 56 | 5153 | 5 | 0.6 | 0.4 | 213 | 3.5 | 445 | 1.4 | 1.4 |
| 57 | 5153 | 5 | 0.6 | 0.4 | 213 | 3.5 | 445 | 1.4 | 1.4 |
| 58 | 5153 | 5 | 0.6 | 0.4 | 213 | 3.5 | 445 | 1.4 | 1.4 |
| 59 | 5059 | 3 | 0.6 | 0.6 | 207 | 7 | 306 | 0.09 | 1 |
| 60 | 5059 | 3 | 0.6 | 0.6 | 207 | 7 | 306 | 0.09 | 1 |
| 61 | 5059 | 3 | 0.6 | 0.6 | 207 | 7 | 306 | 0.09 | 1 |
| 62 | 5059 | 3 | 0.6 | 0.6 | 207 | 7 | 306 | 0.09 | 1 |
| 63 | 5059 | 3 | 0.6 | 0.6 | 207 | 7 | 306 | 0.09 | 1 |
| 64 | 5059 | 3 | 0.6 | 0.6 | 207 | 7 | 306 | 0.09 | 1 |
| 65 | 5059 | 3 | 0.6 | 0.6 | 207 | 7 | 306 | 0.09 | 1 |
| 66 | 5059 | 3 | 0.6 | 0.6 | 207 | 7 | 306 | 0.09 | 1 |
| 67 | 5153 | 5 | 0.6 | 0.4 | 213 | 3.5 | 445 | 1.4 | 1.4 |
| 66 | 5153 | 5 | 0.6 | 0.4 | 213 | 3.5 | 445 | 1.4 | 1.4 |

The data shown in Tables 1 to 4 illustrates that for each batch of the formulation, there are 34 $p$measured properties, that is, 10 for constituent A, 1 for constituent B, 5 for constituent C, and 18 for constituent D. It will be appreciated that if each of these measured properties were to be monitored using univariate SPC charts, it would be very difficult to obtain meaningful information with regards the overall formulation. Examples of the properties measured are given in Table 5.

TABLE 5

Classification indices used for measured constituent properties.

| INDEX N0. | CONSTITUENT PROPERTY | |
| --- | --- | --- |
| 1 | A1 | (vol) |
| 2 | A2 | (SP) |
| 3 | A3 | (area) |
| 4 | A4 | (Cr) |
| 5 | A5 | (Cu) |
| 6 | A6 | (Fe) |
| 7 | A7 | (Mg) |
| 8 | A8 | (Ni) |
| 9 | A9 | (Sl) |
| 10 | A10 | (Zn) |
| 11 | B | (vol) |
| 12 | C1 | (neutact) |
| 13 | C2 | (pH) |
| 14 | C3 | (sol) |
| 15 | C4 | (cond) |
| 16 | C5 | (ratio) |
| 17 | D1 | (JStr) |
| 18 | D2 | (vis) |
| 19 | D3 | (pH) |
| 20 | D4 | (moist) |

TABLE 5-continued

Classification indices used for measured constituent properties.

| INDEX N0. | CONSTITUENT PROPERTY | |
| --- | --- | --- |
| 21 | D5 | λ1 |
| 22 | D6 | λ2 |
| 23 | D7 | (Ca) |
| 24 | D8 | (Mg) |
| 25 | D9 | (Cl) |
| 26 | D10 | (NO3) |
| 27 | D11 | (NO2) |
| 28 | D12 | (Fe) |
| 29 | D13 | (Cu) |
| 30 | D14 | (Na) |
| 31 | D15 | (K) |
| 32 | D16 | (SO4) |
| 33 | D17 | (Cr) |
| 34 | D18 | (LS) |

In accordance with the present invention, principal component analysis (PCA) is used with these data. This reduces the dimensionality of the problem to a set of principal components which explain a significant amount of variability of the original data set. The PCA model of the system is based on a set of data which is known to be representative of typical characteristics expected in a product. In this specific case, data, as shown in Tables 1 to 4, were collected over a period of time to develop the model and the last 19 sets of data were used to test the ability of the model so developed to detect out-of-control conditions.

It will be readily appreciated that any final model used for a product is likely to be the result of several iterations and optimisations in view of the aims and objectives with respect to product performance characteristics. The result which is to be obtained is to maintain the product performance characteristics within clearly defined limits and to establish swiftly the cause of any out-of-control conditions.

PCA produces a set of components which are derived from a linear transformation of the original variables which have been standardised, that is, they have a mean of zero and a variance of one. In this way, all the variables have equal weight in the analysis. The most important feature of the new components is that they are independent and orthogonal to each other. A sufficient number of the new components are extracted so as to form a model which accounts for a significant amount of variability in the original data. In this way, the dimensionality of the problem is reduced and is more apparent the larger the number of variables which are consistently monitored.

The 34 properties measured, as shown in Tables 1 to 4 and summarised in Table 5 above, are represented by a PCA model with only five principal components. This model accounts for more than 90% of the variability in the original data set. $Q_{res}$ accounts for the residual variability as represented by the other 29 principal components.

Each of the 5 principal components consists of a series of loadings which weight the initial measured properties of the constituents or raw materials in terms of their contribution to the variability in the model. The contributions can be assessed subjectively to ascribe and to identify the new components. The loadings of three principal components, namely, components 3, 4 and 5, are shown in FIGS. 1, 2 and 3 respectively.

Figure 2:
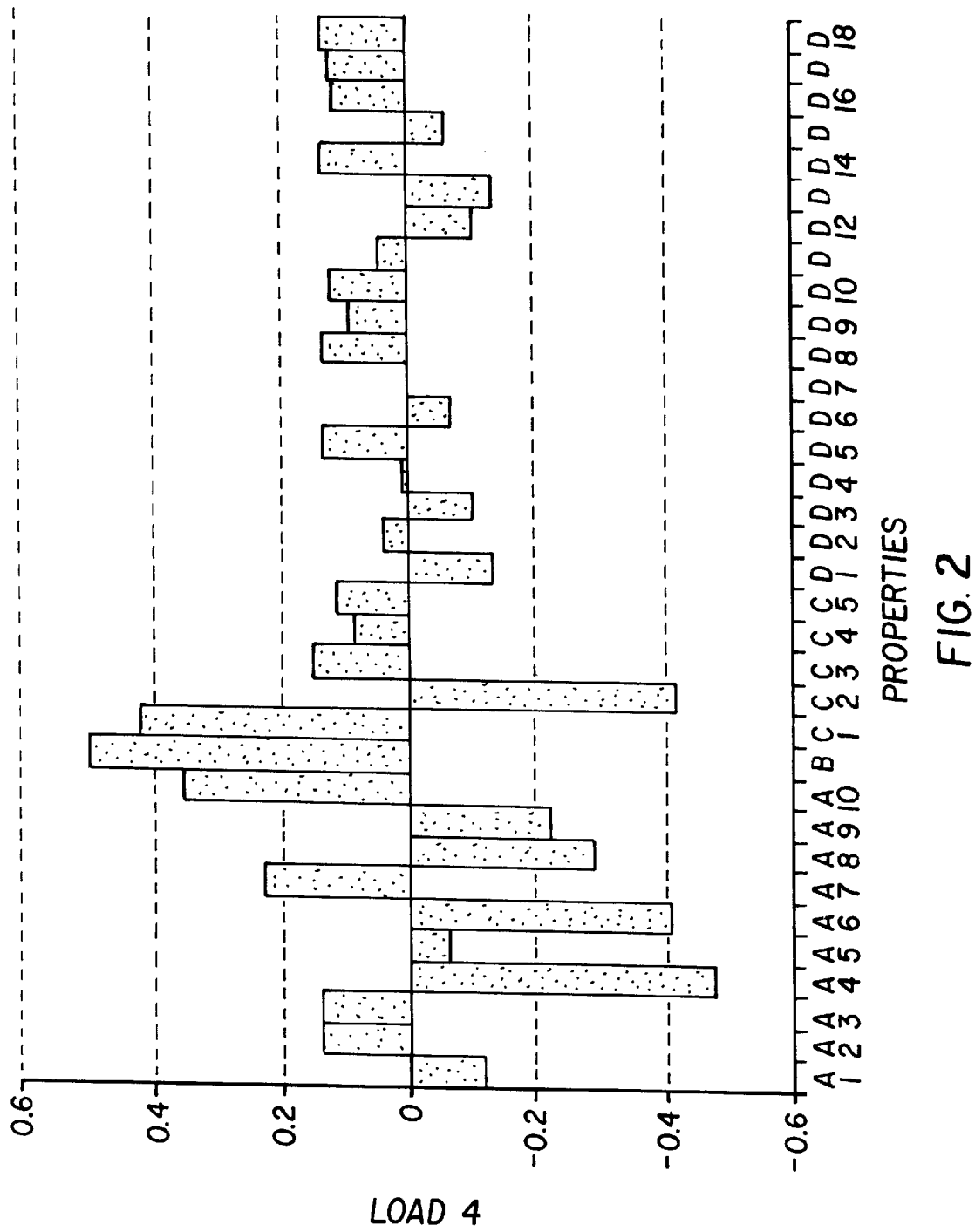
FIG. 2 is a chart showing the loadings for the fourth principal component.
Figure 3:
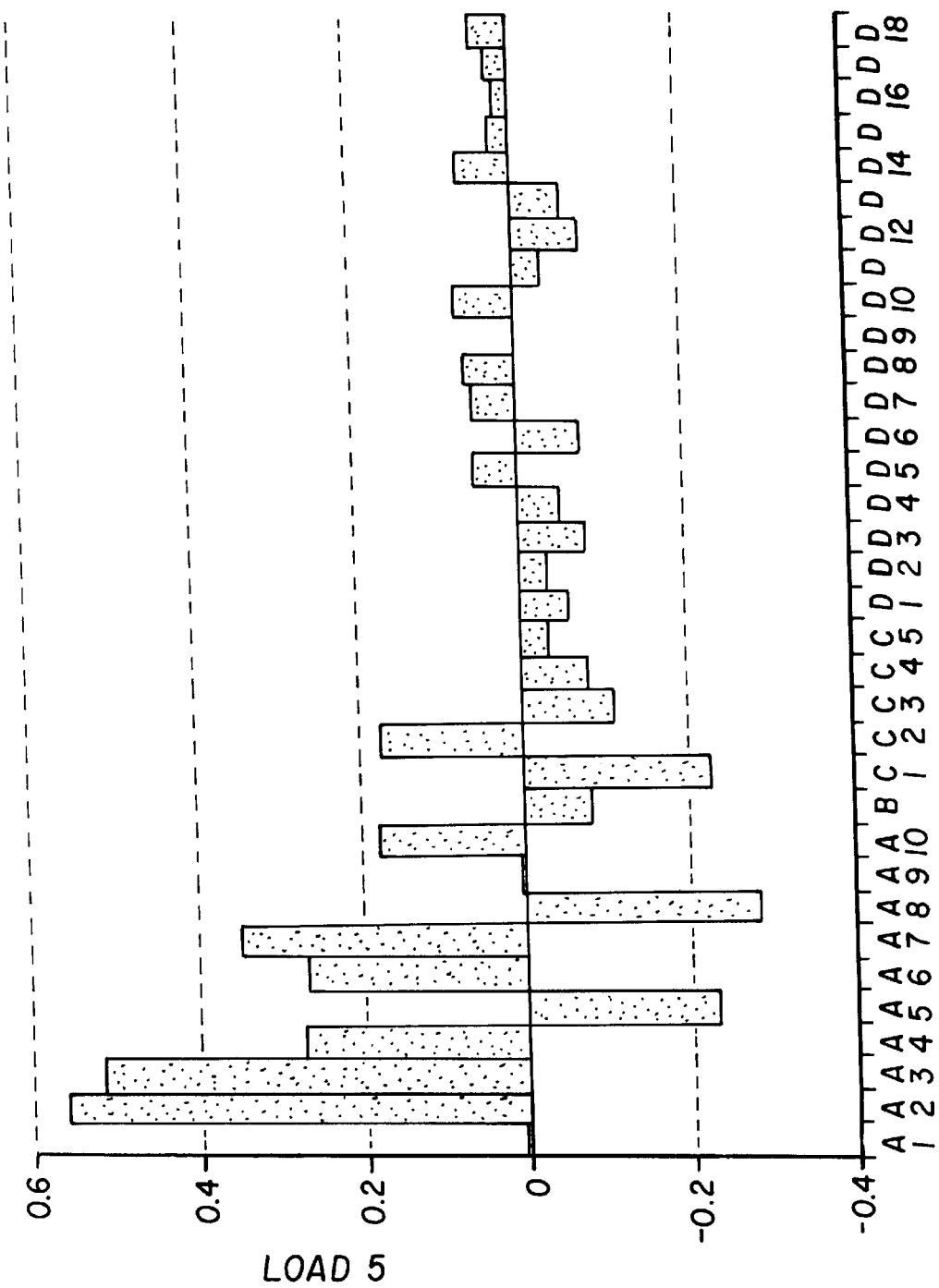
FIG. 3 is a chart showing the loadings for the fifth principal component.

From FIGS. 1 and 2, it can be seen that the properties of constituents A and C are weighted heavily in principal components 3 and 4, whereas the loadings in FIG. 3 are dominated only by constituent A for principal component 5.

Hotelling's $T^2$ is then derived from the sum of the squares of the scores of each of the principal components included in the model, for example, when applied to a new set of data is received from a process. The 99% limit on $T^2$ is determined by the number of components in the model, the size of the original data set and the Fisher F variance ratio test as defined in *Statistical Methods*, Seventh Edition, 1980, G. W. Snedecor & W. G. Cochran, Iowa State University Press.

It will be appreciated that although a 99% limit is used in this example, other suitable limits can be chosen so as to represent a level of risk associated with a particular selection process.

Hotelling's $T^2$ parameter for two variables, namely, x and y, with means $\bar{x}$ and $\bar{y}$, standard deviations of $s_x$ and $s_y$ and with some correlation indicated by the covariance $s_{xy}$ is given by the equation:

$$T^2 = \frac{s_x^2 s_y^2}{s_x^2 s_y^2 - s_{xy}^2} \left[ \frac{(x-\bar{x})^2}{s_x^2} + \frac{(y-\bar{y})^2}{s_y^2} - \frac{2 s_{xy}(x-\bar{x})(y-\bar{y})}{s_x^2 s_y^2} \right]$$

and can be easily extended using matrix notation to n dimensions as follows:

$$T^2 = [x-\bar{x}]' S^{-1} [x-\bar{x}]$$

where
S is the covariance matrix; and
$[x-\bar{x}]$ is the matrix of data corrected with respect to the means.

In PCA, $T^2$ is merely the sum of squares of the weighted scores of the principal components included in the model.

An additional parameter, $Q_{res}$, is also calculated. $Q_{res}$ is a weighted sum of the squares of the scores of the principal components not included in the model and is given by:

$$Q_{res} = (x-\hat{x})'(x-\hat{x})$$

where
x is the matrix of data; and
$\hat{x}$ is the matrix of estimates of x from the model.

The value of $T^2$ and $Q_{res}$ are calculated for any subsequent situation and compared with the 99% limits defined for the system. If either parameter exceeds the limits then there will be a significant change in the characteristics of the constituents which is likely to affect the overall product performance characteristics. The exact reason can be quickly identified by examining the contributions of the scores producing the high value of $T^2$.

In most cases, $T^2$ and $Q_{res}$ exceed limits simultaneously, but relate to different aspects of the model of the product. $T^2$ looks at the systematic random variability within the model whereas $Q_{res}$ assesses systematic non-random variability not captured by the model.

Figure 4:
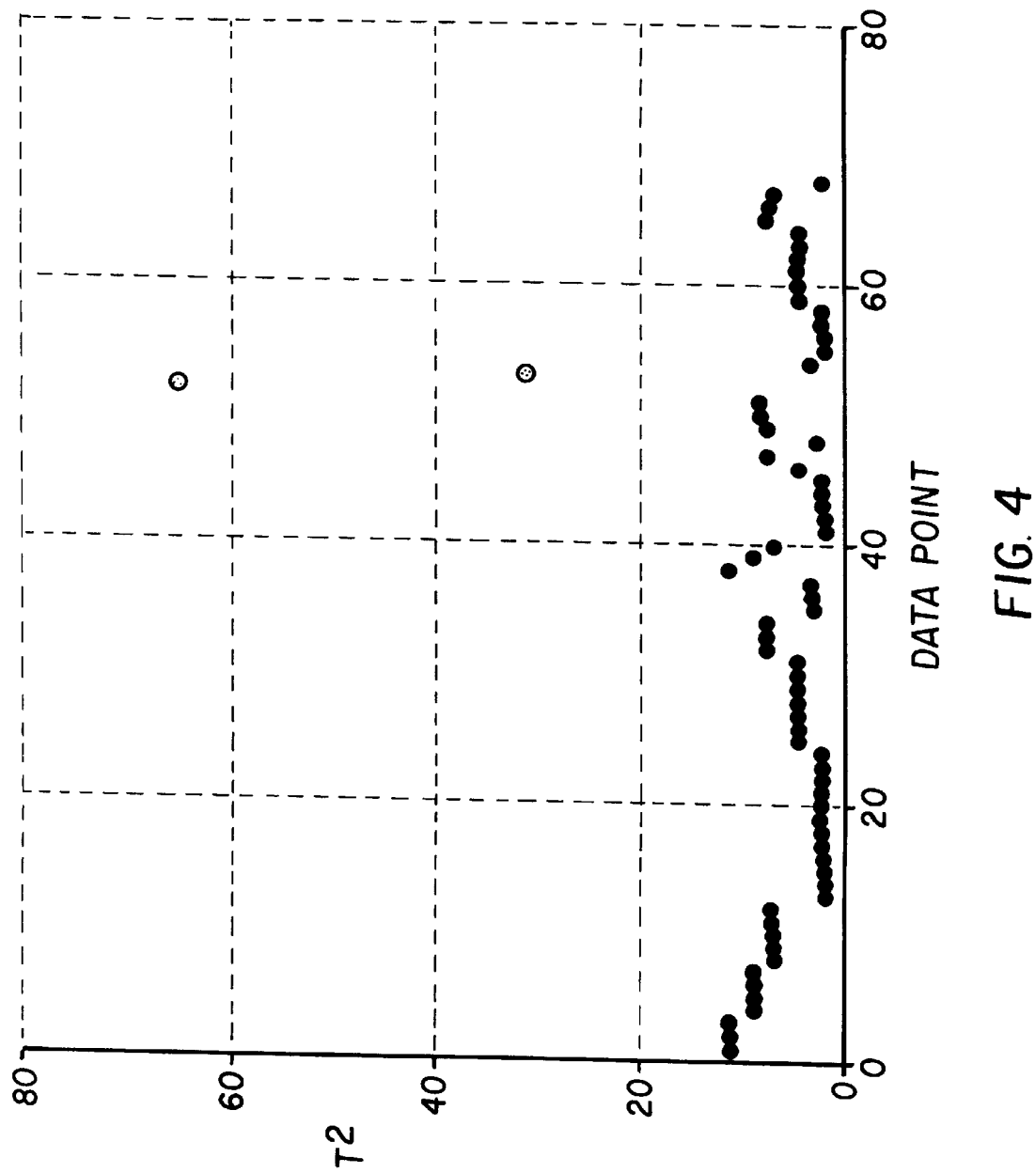
FIG. 4 is a chart showing the $T^2$ values for each data point.
Figure 5:
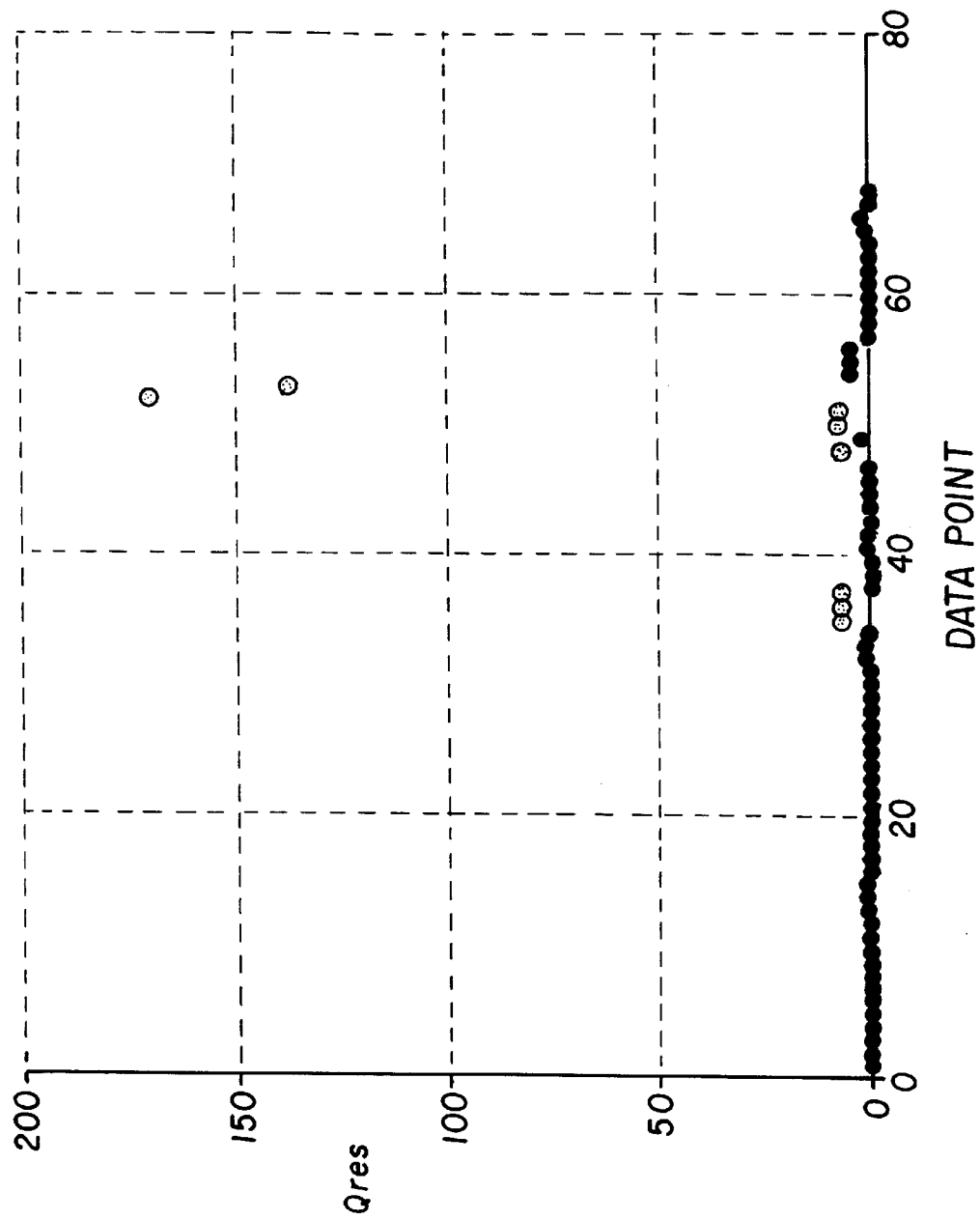
FIG. 5 is a chart showing the $Q_{res}$ values for each data point.

The $T^2$ and $Q_{res}$ charts for this specific example are shown in FIGS. 4 and 5 respectively. The method of ascribing the contribution to each score is described in a paper by P. Miller, R. E. Swanson & C. F. Heckler entitled *Contribution Plots: The Missing Link in Multivariate Quality Control* presented at the 37th Annual Fall Conference (1993), ASQC, Rochester, N.Y., U.S.A. The highest score is then used to assess which of the monitored variables has resulted in the out-of-control condition (control failure). The, or each, monitored variable found to be producing the out-of-control condition is then adjusted to bring the process back into control in line with the CAGs mentioned above.

In this specific example, the first 49 data points in each Figure represent the data on which the PCA model is based. $T^2$ and $Q_{res}$ parameters indicate that the process is in control with respect to the monitored properties or variables in the reference data. The next 19 data points represent a test set which is derived in effect from the same source. These points show that generally the selection process is in good control, except that data points 52 and 53 represent out-of-control conditions since both $T^2$ and $Q_{res}$ exceed limits for the process.

Figure 6:
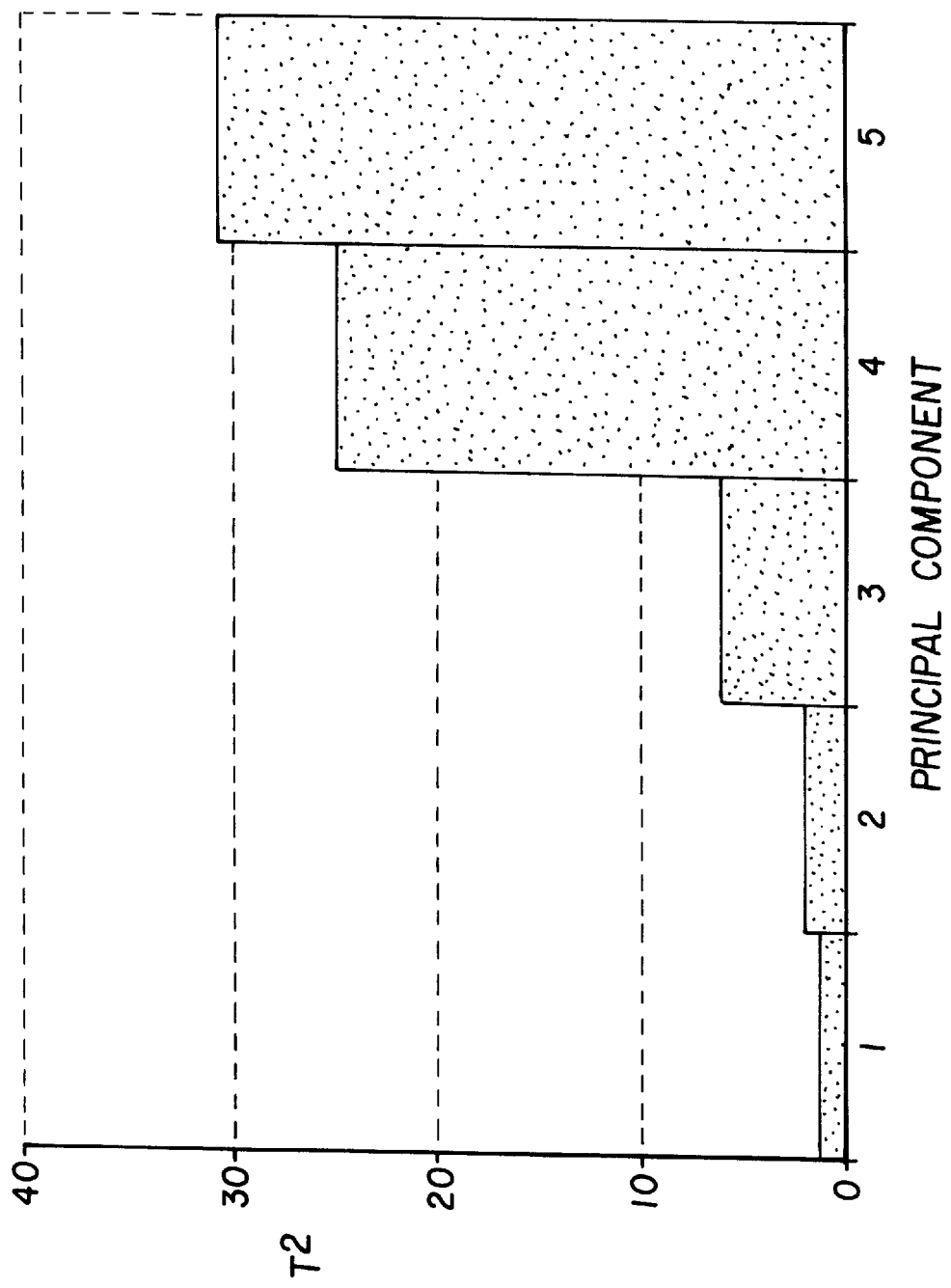
FIG. 6 illustrates the contribution of each principal component to the $T^2$ value for data point 52.
Figure 7:
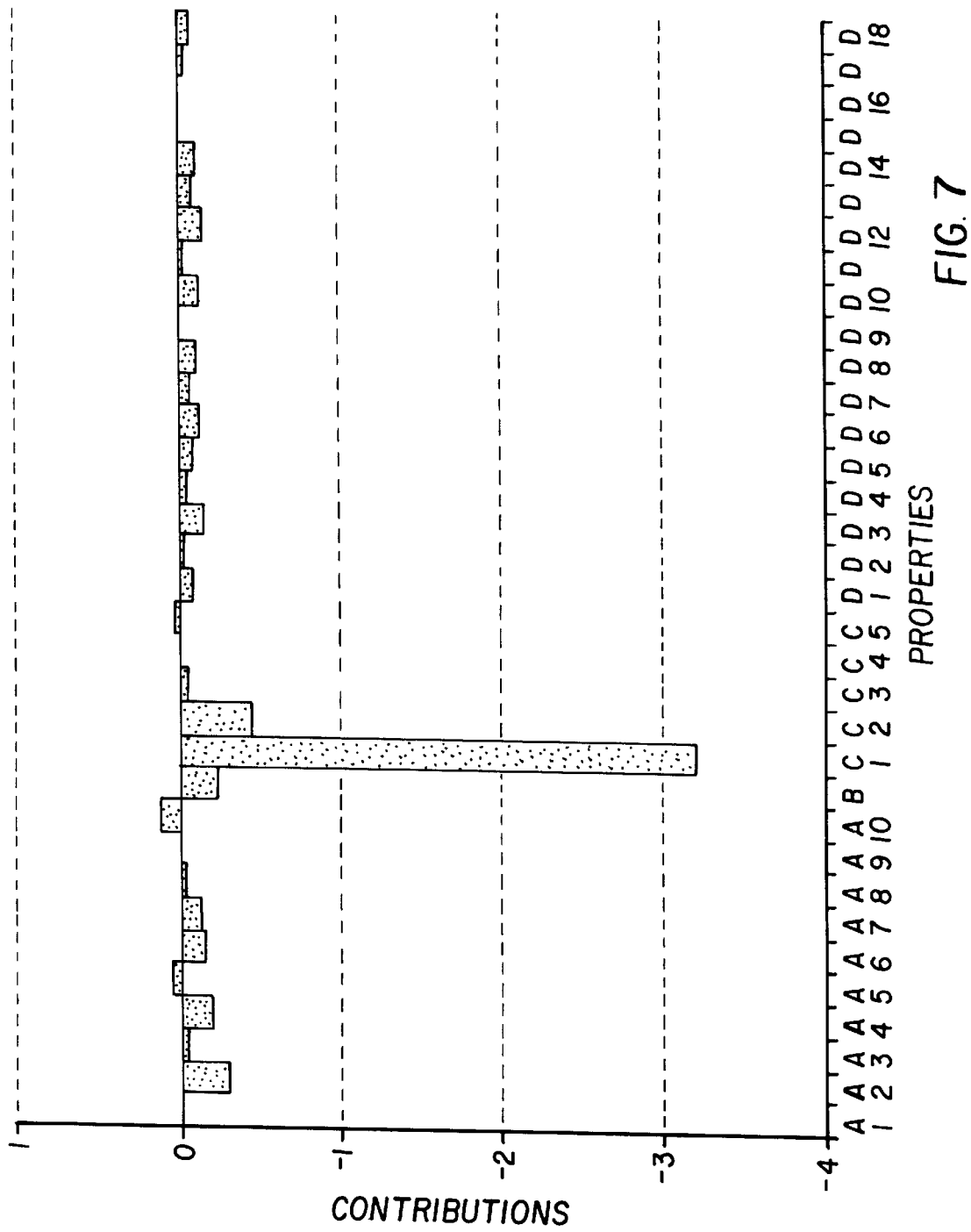
FIG. 7 illustrates the contribution of each property to the fifth principal component for data point 52.

For data point 52, the contribution of each score to the high $T^2$ value is plotted in FIG. 6. The chart shows that principal component 5 produces the largest contribution to the high $T^2$ value. When the contributions to the score of principal component 5 is investigated, FIG. 7, it can be seen that index 12, that relating to property C1 (neutact) of constituent C, has the largest contribution.

Figure 8:
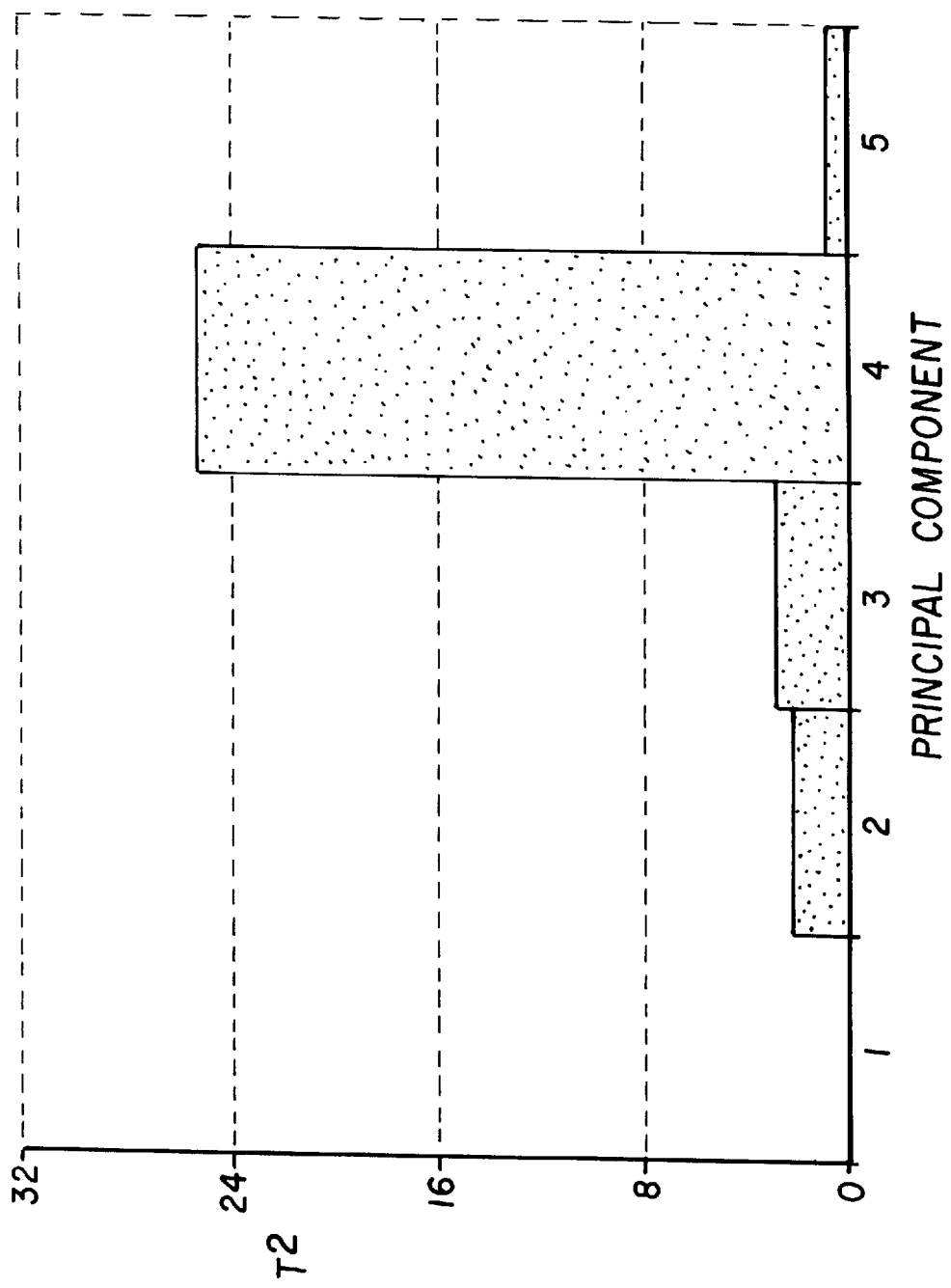
FIG. 8 illustrates the contribution of each principal component to the $T^2$ value for data point 53.
Figure 9:
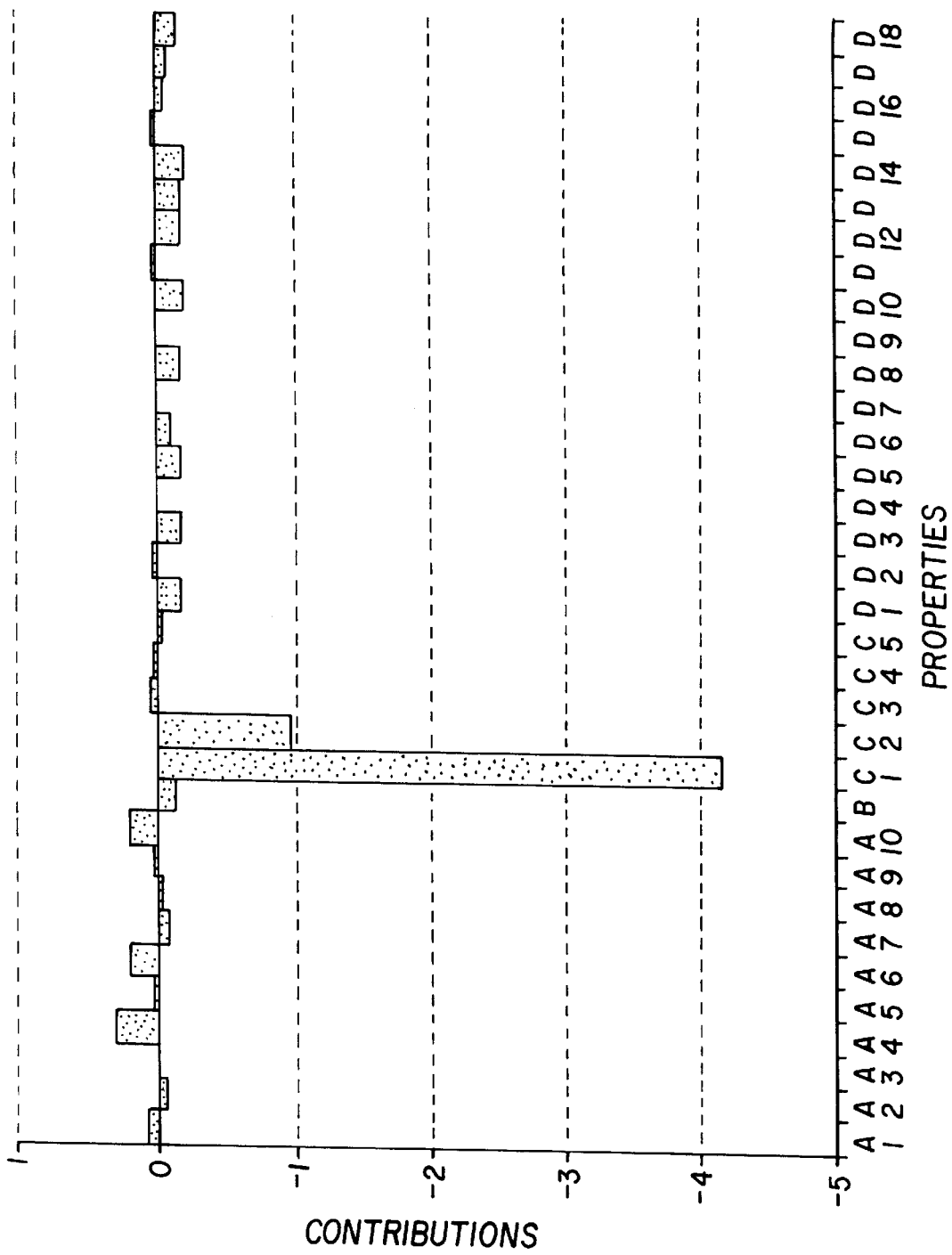
FIG. 9 illustrates the contribution of each property to the fourth principal component for data point 53.
Figure 10:
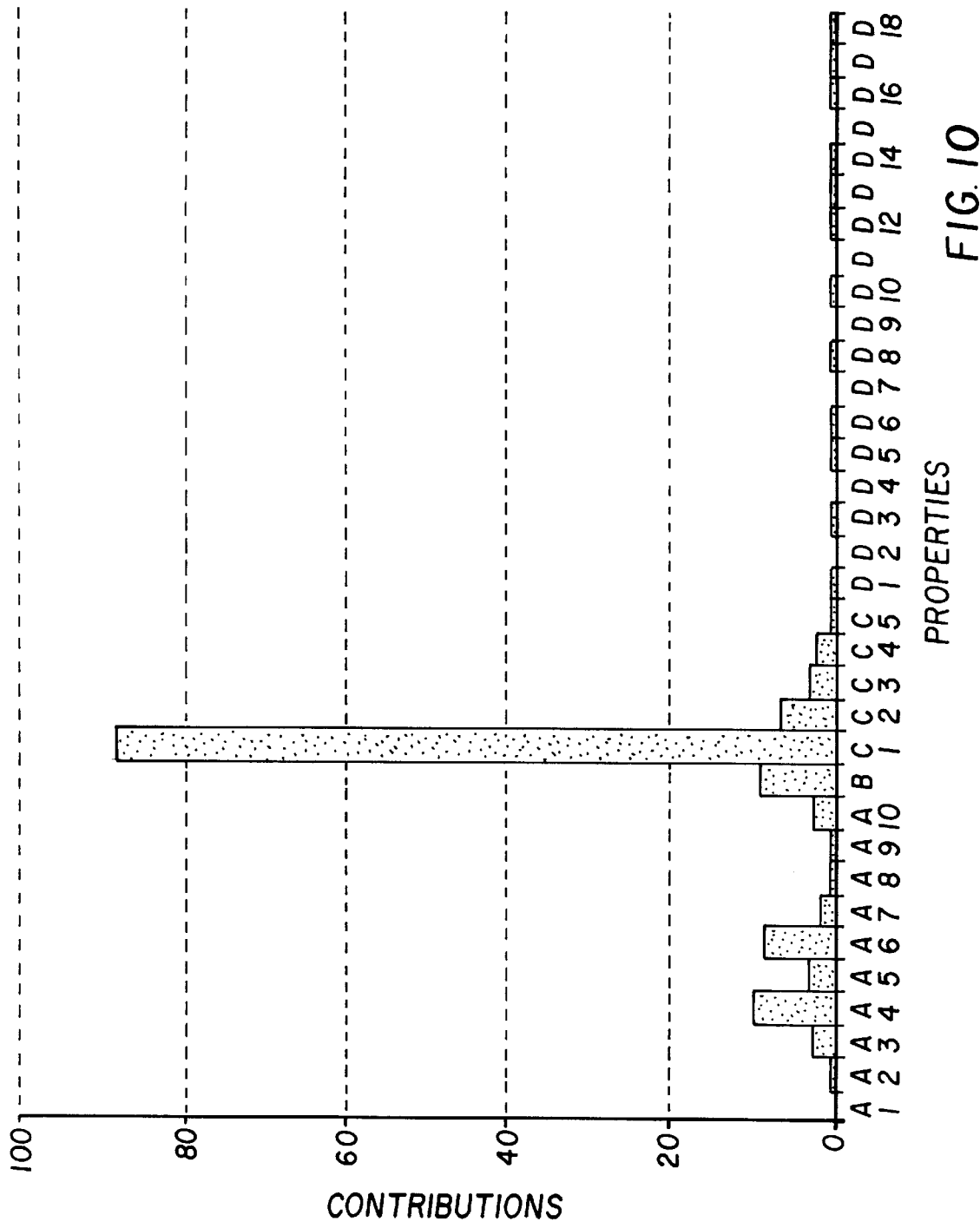
FIG. 10 illustrates the contribution of the properties to the $Q_{res}$ value for data point 53.

For data point 53, the contribution of each score to the high $T^2$ value is plotted in FIG. 8. The chart shows that principal component 4 produces the largest contribution to the high $T^2$ value. When the contributions to the score of principal component 4 is investigated, FIG. 9, it can be seen that index 12, that relating to property C1 (neutact) of constituent C, has the largest contribution. This is also confirmed in the chart for $Q_{res}$ as shown in FIG. 10.

Figure 11:
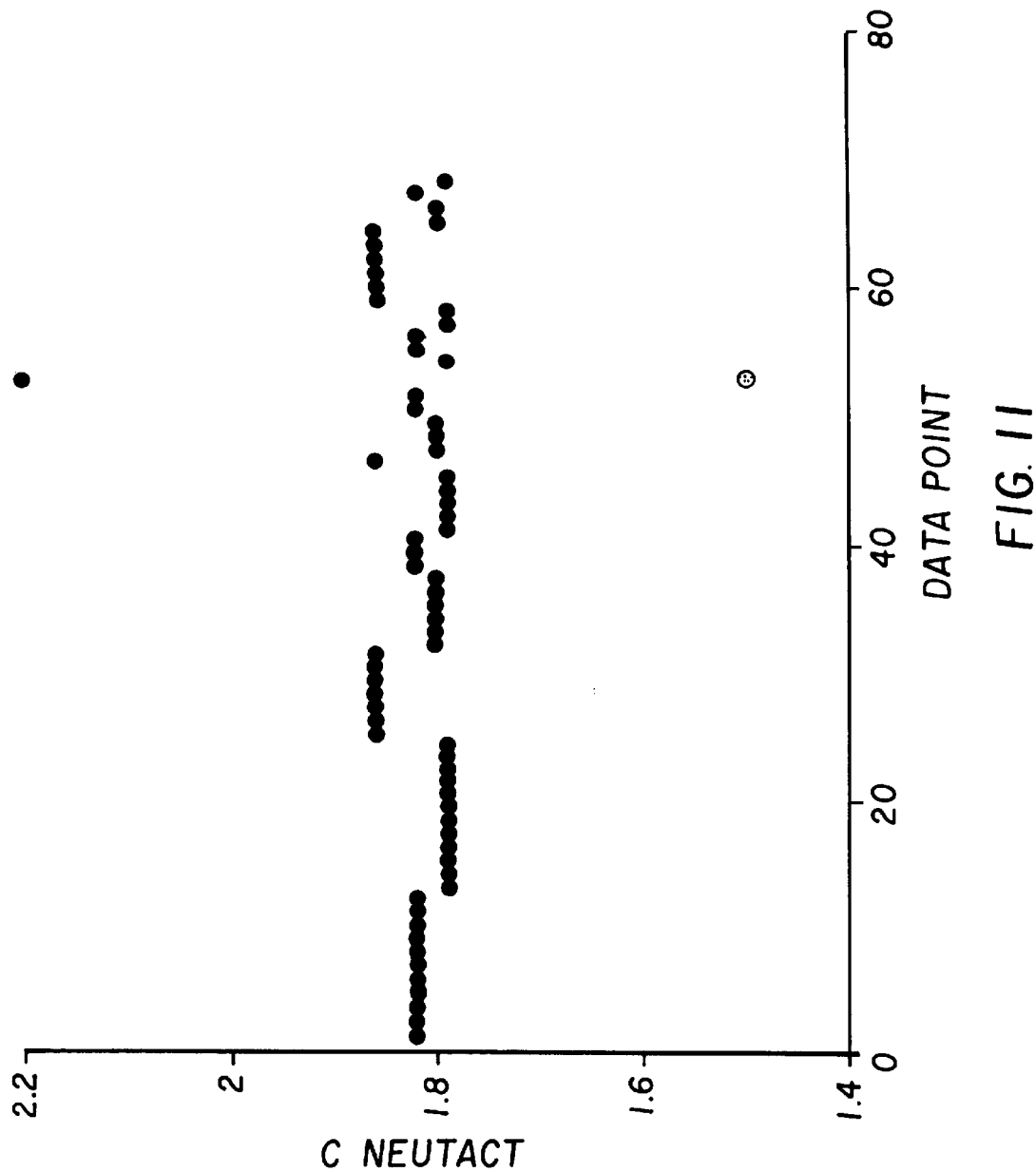
FIG. 11 is a chart showing the trend plot for index 12 corresponding to property C1.

The trend chart for C1 is shown in FIG. 11. It can readily be seen that the points corresponding to data points 52 and 53 are out-of-control. This is supported by the data given in Table 3, column C1, for batch 52 and 53. Here, it will be seen that the 49 batches of data used to create the model of the selection process have values which fall within the boundaries 1.79 and 1.86. Data points 52 and 53 are 2.2 and 1.5 respectively and therefore fall outside the model.

As a consequence, it can readily be seen that property C1 (neutact) of constituent C is the offending parameter.

Therefore, by understanding this particular problem or by investigating why it has occurred on this particular occasion provides a means of controlling the effect of raw materials on the manufacturability of a product.

In accordance with the present invention, the following advantages are obtained:

a) A single number, providing an indication of the control of the selection process, is derived from a multitude of characteristics monitored for a group of raw materials producing a given formulation which captures the essential properties. These properties are those which affect the output response variability in the final photographic product. The single number is compared with a reference standard as defined for that particular formulation. If the single number exceeds a critical value determined by the reference standard, an out-of-control condition is indicated.

b) Product manufacturability from this assessment of each group of raw materials prior to later stages of the manufacturing process leads to less waste and variability in the manufactured product.

c) The method also allows the causes of possible changes in product characteristics to be established quickly and then either measures can be put in place to correct these problems or new algorithms generated to reflect the new position provided that it has no impact on the final product.

The method in accordance with the present invention has greater efficacy and yields results which are superior to those obtained by traditional univariate techniques.

Although the present invention has been described with reference to a selection process for an emulsion making process, it will be readily appreciated that the present invention can be implemented in any manufacturing process having a selection process where constituents are selected in accordance with specified performance characteristics of a final product.

Naturally, the present invention can be used to monitor any important property of a constituent which has an impact on performance characteristics of a final product.

From the weightings shown in FIGS. 1, 2 and 3, it can be seen that some of the properties have been given more importance than others. In some instances, the importance of certain properties, variables or parameters may be emphasised with respect to the relationship with other performance characteristics of the manufactured product by use of Partial Least Squares (PLS). PLS is a multivariate statistical technique which is closely related to PCA in all other respects. The same parameters, namely, $T^2$ and $Q_{res}$ can be derived from the results of an analysis so as to allow efficient and effective interpretation of why a selection or other process has failed.

I claim:

1. A method of controlling the effect of raw material constituents on a product produced by a manufacturing process, the product being manufactured using a plurality of constituents and having specified product performance characteristics, the manufacturing process having a constituent selection stage in which the constituents are selected in accordance with the product being manufactured, the method comprising the steps of:

a) defining a set of properties for each of the constituents which affect the product performance characteristics;

b) sampling data relating to the set of properties of the constituents from product produced by the manufacturing process;

c) defining a model using the sampled data to provide a reference position for a combination of the constituents which provides good product from the manufacturing process, the model being defined using a multivariate statistical process control technique in terms of parameters $T^2$ and $Q_{res}$, the model including a series of loadings which weight the initial measured properties of the constituents, each of the loadings having a score resulting from the measured properties of the constituents, where $T^2$ is Hotelling's $T^2$ parameter and $Q_{res}$ is an additional parameter representing the systematic non-random variability not captured by the model d) applying limits to the model indicative of out-of-control conditions;

e) monitoring the constituent selection stage for out-of-control conditions; and f) taking corrective action to select appropriate constituents at the constituent selection stage which provide the specified product performance characteristics of the product.

2. A method according to claim 1, wherein if the $T^2$ parameter exceeds a predetermined limit, the contribution of the scores to that $T^2$ parameter is interrogated to determine which score is the primary contributor.

3. A method according to claim 2, wherein the score which forms the primary contributor is interrogated further to assess which of the measured properties of the constituents is of significance.

4. A method according to claim 1 wherein if $Q_{res}$ parameter exceeds a predetermined limit, the contributions to that parameter is interrogated to determine which score is the primary contributor.

5. A method according to claim 1, wherein the multivariate statistical process control technique includes principal component analysis (PCA), and $T^2$ and $Q_{res}$ are calculated as follows $$T^2 = [x-\bar{x}]'S^{-1}[x-\bar{x}]$$

where

S is the covariance matrix; and $[x-\bar{x}]$ is the matrix of data corrected with respect to the means, and $$Q_{res} = (x-\hat{x})'(x-\hat{x})$$

where x is the matrix of data; and $\hat{x}$ is the matrix of estimates of x from the model.

6. A method according to claim 1, wherein the multivariate statistical process control technique includes partial least squares (PLS).

* * * * *